(12) United States Patent
Wiedmeyer et al.

(10) Patent No.: US 11,321,908 B2
(45) Date of Patent: May 3, 2022

(54) COMPUTERIZED SYSTEM AND METHOD FOR SCANNING APPAREL INTO THREE DIMENSIONAL REPRESENTATIONS

(71) Applicant: InContext Solutions, Inc., Chicago, IL (US)

(72) Inventors: Tracey Wiedmeyer, Kewaskum, WI (US); Manil Bastola, Millersville, MD (US)

(73) Assignee: InContext Solutions, Inc., Chicago, IL (US)

( * ) Notice: Subject to any disclaimer, the term of this patent is extended or adjusted under 35 U.S.C. 154(b) by 23 days.

(21) Appl. No.: 16/698,095

(22) Filed: Nov. 27, 2019

(65) Prior Publication Data

US 2020/0193678 A1  Jun. 18, 2020

Related U.S. Application Data

(60) Provisional application No. 62/773,011, filed on Nov. 29, 2018.

(51) Int. Cl.
| | |
|---|---|
| *G06T 15/04* | (2011.01) |
| *G06T 11/40* | (2006.01) |
| *G06Q 30/06* | (2012.01) |
| *G06T 7/73* | (2017.01) |
| *G06T 7/55* | (2017.01) |

(52) U.S. Cl.
CPC ......... *G06T 15/04* (2013.01); *G06Q 30/0643* (2013.01); *G06T 7/55* (2017.01); *G06T 7/75* (2017.01); *G06T 11/40* (2013.01); *G06T 2207/10028* (2013.01); *G06T 2207/30124* (2013.01)

(58) Field of Classification Search
None
See application file for complete search history.

(56) References Cited

U.S. PATENT DOCUMENTS

| | | | | |
|---|---|---|---|---|
| 2004/0196294 | A1* | 10/2004 | hong | G06T 11/001 345/582 |
| 2015/0348285 | A1* | 12/2015 | Wang | G06T 15/04 345/582 |
| 2017/0287210 | A1* | 10/2017 | Tepmongkol | G06T 7/579 |
| 2018/0293774 | A1* | 10/2018 | Yu | G06T 15/06 |

(Continued)

*Primary Examiner* — Tapas Mazumder
(74) *Attorney, Agent, or Firm* — Locke Lord LLP; Christopher J. Capelli

(57) ABSTRACT

A computer system and process for scanning apparel items for generation of three-dimensional (3D) reproduced representations of scanned apparel items having folding line indications. An electronic scan is created of at least one apparel item by an imaging device. Point clouds are determined from the at least one scanned apparel item and at least one high polygon 3D model is determined from the point clouds. 3D translation and rotational camera reference images are generated which are associated with the at least one scanned apparel item. Next, a mannequin pose estimation and correction is determined utilizing the generated 3D translation and rotational camera reference images and mannequin detection and removal is then determined relative to the at least one scanned apparel item. Information (data) for indication of fold lines for folding the at least one scanned apparel item is the determined.

7 Claims, 2 Drawing Sheets

(56) References Cited

U.S. PATENT DOCUMENTS

2019/0026956 A1\* 1/2019 Gausebeck ............. G06T 7/579
2019/0236222 A1\* 8/2019 Allen ..................... G06N 5/025
2019/0266795 A1\* 8/2019 Aluru ..................... G06T 17/10

\* cited by examiner

COMPUTERIZED SYSTEM AND METHOD FOR SCANNING APPAREL INTO THREE DIMENSIONAL REPRESENTATIONS

CROSS REFERENCE TO RELATED APPLICATIONS

This application claims priority to U.S. patent application Ser. No. 62/773,011 filed Oct. 29, 2019 which is incorporated herein by reference in its entirety.

FIELD OF THE INVENTION

The disclosed embodiments generally relates to three dimensional (3D) scanning techniques, and more particularly, to a system and method for generating 3D images of apparel items/garments manipulatable in various illustrative representations.

BACKGROUND OF THE INVENTION

A deficiency exist in computer imaging systems for determining and generating multiple (and accurate) 3D representations of clothing apparel items/garments for use in multiple 3D and mixed reality products and solutions. It is to be appreciated that with regards to apparel items, a growing need exists to represent apparel items in multiple illustrative formats, including (but not limited to): suitable for hanging, a folded condition for preferably stacking upon on another; and staged on a mannequin or like structure for illustrating use (wear) of the apparel item.

Thus, a present need exists for providing an improved specifically configured computer imaging system and method that is operative to enable generation of multiple three-dimensional (3D) representations of apparel items in multiple illustrative formats, including (but not limited to): hanging suitable, folded and staged for mannequin display.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with a purpose of the illustrated embodiments, in one aspect, provided is an improved computer imaging system and method specifically configured and operative to determine and generate multiple three-dimensional (3D) representations of clothing apparel items for use in multiple 3D and mixed reality products and solutions, preferably using a single depth sensing scan and various apparel images.

In particular, described in accordance with illustrated embodiments are a computer system and process for scanning apparel items for generation of three-dimensional (3D) reproduced representations of scanned apparel items having folding line indications. An electronic scan is created of at least one apparel item by an imaging device. Point clouds are determined from the at least one scanned apparel item and at least one high polygon 3D model is determined from the point clouds. 3D translation and rotational camera reference images are generated which are associated with the at least one scanned apparel item. Next, a mannequin pose estimation and correction is determined utilizing the generated 3D translation and rotational camera reference images and mannequin detection and removal is then determined relative to the at least one scanned apparel item. Information (data) for indication of fold lines for folding the at least one scanned apparel item is the determined.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
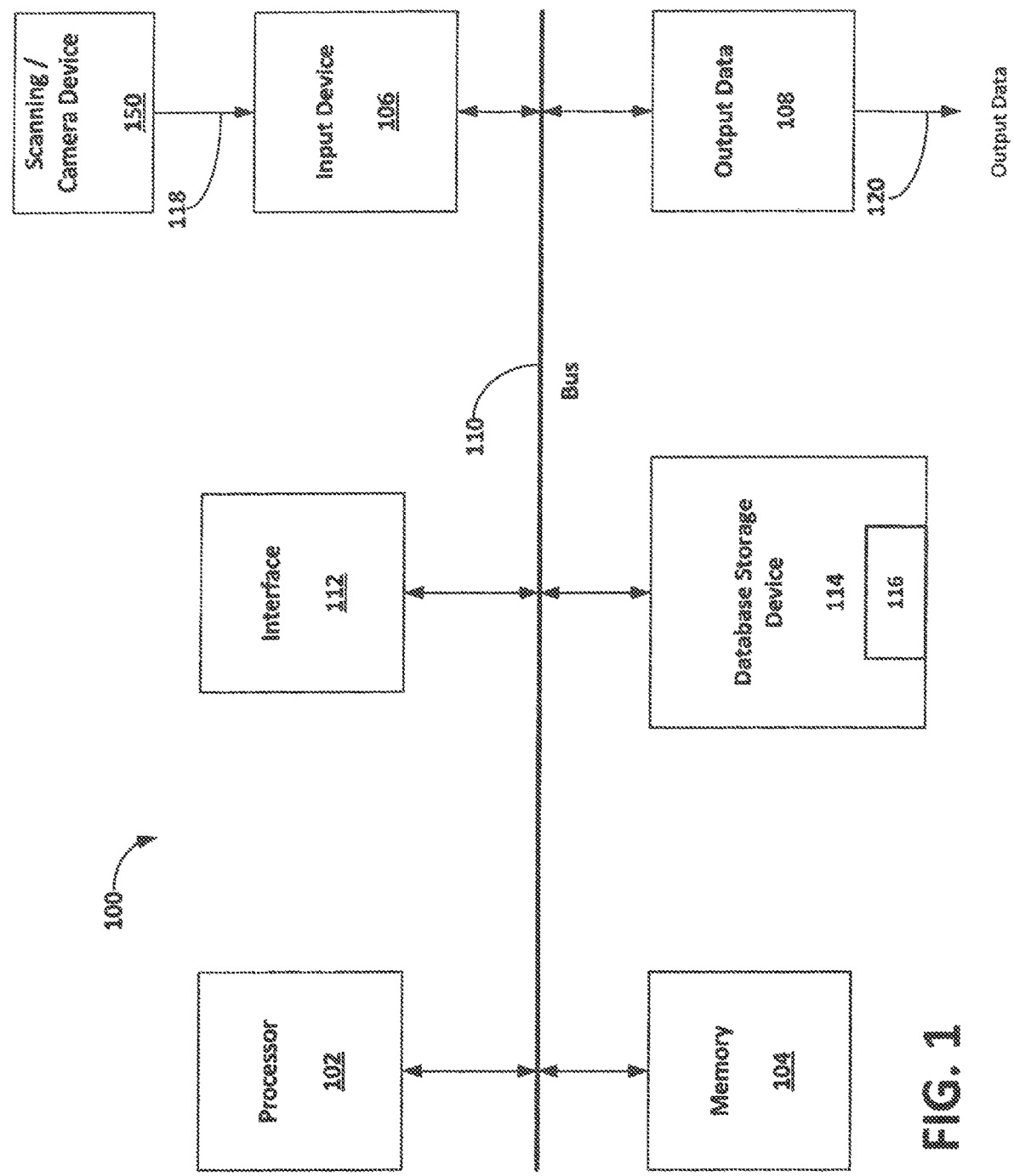
FIG. 1 illustrates a system overview and data-flow in one embodiment of system operation.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Where a range of values is provided, it is understood that each intervening value, to the tenth of the unit of the lower limit unless the context clearly dictates otherwise, between the upper and lower limit of that range and any other stated or intervening value in that stated range is encompassed within the illustrated embodiments. The upper and lower limits of these smaller ranges may independently be included in the smaller ranges is also encompassed within the illustrated embodiments, subject to any specifically excluded limit in the stated range. Where the stated range includes one or both of the limits, ranges excluding either both of those included limits are also included in the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims. All publications and references cited herein are expressly incorporated herein by reference in their entirety.

Turning now descriptively to the drawings, in which similar reference characters denote similar elements throughout the several views, FIG. 1 depicts a computing system that is specifically configured to achieve the functionality of the present invention described herein. FIG. 1 illustrates processing system 100 which generally comprises at least one processor 102, or processing unit or plurality of processors, memory 104, at least one input device 106 and at least one output device 108, coupled together via a bus or group of buses 110. In certain embodiments, input device 106 and output device 108 could be the same device. An interface 112 can also be provided for coupling the processing system 100 to one or more peripheral devices, for example interface 112 could be a PCI card or PC card. At least one storage device 114 which houses at least one database 116 can also be provided. The memory 104 can be any form of memory device, for example, volatile or non-volatile memory, solid state storage devices, magnetic devices, etc. The processor 102 could comprise more than one distinct processing device, for example to handle different functions within the processing system 100. Input device 106 receives input data 118 and can comprise, for example, a keyboard, a pointer device such as a pen-like device or a mouse, audio receiving device for voice controlled activation such as a microphone, data receiver or antenna such as a modem or wireless data adaptor, data acquisition card, etc. Input data 118 could come from different sources, for example keyboard instructions in conjunction with data received via a network. Output device 108 produces or generates output data 120 and can comprise, for example, a display device or monitor in which case output data 120 is visual, a printer in which case output data 120 is printed, a port for example a USB port, a peripheral component adaptor, a data transmitter or antenna such as a modem or wireless network adaptor, etc. Output data 120 could be distinct and derived from different output devices, for example a visual display on a monitor in conjunction with data transmitted to a network. A user could view data output, or an interpretation of the data output, on, for example, a monitor or using a printer. The storage device 114 can be any form of data or information storage means, for example, volatile or non-volatile memory, solid state storage devices, magnetic devices, etc.

In use, the processing system 100 is adapted to allow data or information to be stored in and/or retrieved from, via wired or wireless communication means, at least one database 116. The interface 112 may allow wired and/or wireless communication between the processing unit 102 and peripheral components that may serve a specialized purpose. Preferably, the processor 102 receives instructions as input data 118 via input device 106 and can display processed results or other output to a user by utilizing output device 108. More than one input device 106 and/or output device 108 can be provided. It should be appreciated that the processing system 100 may be any form of terminal, server, specialized hardware, or the like. In accordance with certain illustrated embodiments of the present invention, the processing system is coupled to a depth sensor and RGB camera 150 for imaging apparel items/garments for providing input data to input device 106 as described herein. An example of an RGB camera includes (but is not to be understood to be limited to, a camera device or component equipped with a CMOS sensor through which the colored images of objects are acquired. The acquisition of static photos is typically expressed in megapixels (e.g., 12 MP, 16 MP) that define the amount of pixels (i.e., length×height) that compose a photo.

It is to be appreciated that the processing system 100 may be a part of a networked communications system. Processing system 100 could connect to a network, for example the Internet or a WAN. Input data 118 and output data 120 could be communicated to other devices via the network. The transfer of information and/or data over the network can be achieved using wired communications means or wireless communications means. A server can facilitate the transfer of data between the network and one or more databases. A server and one or more databases provide an example of an information source.

Thus, the processing computing system environment 100 illustrated in FIG. 1 may operate in a networked environment using logical connections to one or more remote computers. The remote computer may be a personal computer, a tablet device, smart phone device, a server, a router, a network PC, a peer device, or other common network node, and typically includes many or all of the elements described above.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is intended to provide a brief, general description of an illustrative and/or suitable exemplary environment in which embodiments of the below described present invention may be implemented. FIG. 1 is an example of a suitable environment and is not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

It is to be further appreciated, embodiments may be implemented with numerous other special-purpose computing devices and computing system environments or configurations. Examples include, but are not limited to, personal computers, handheld or laptop devices, personal digital assistants, tablet devices, smart phone devices, multiprocessor systems, microprocessor-based systems, set top boxes, programmable consumer electronics, network, minicomputers, server computers, game server computers, web server computers, mainframe computers, and distributed computing environments that include any of the above systems or devices. Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in a distributed computing environment where tasks are performed by remote processing devices that are linked through a communications network. In a distributed computing environment, program modules may be located in both local and remote computer storage media including memory storage devices.

Figure 2:
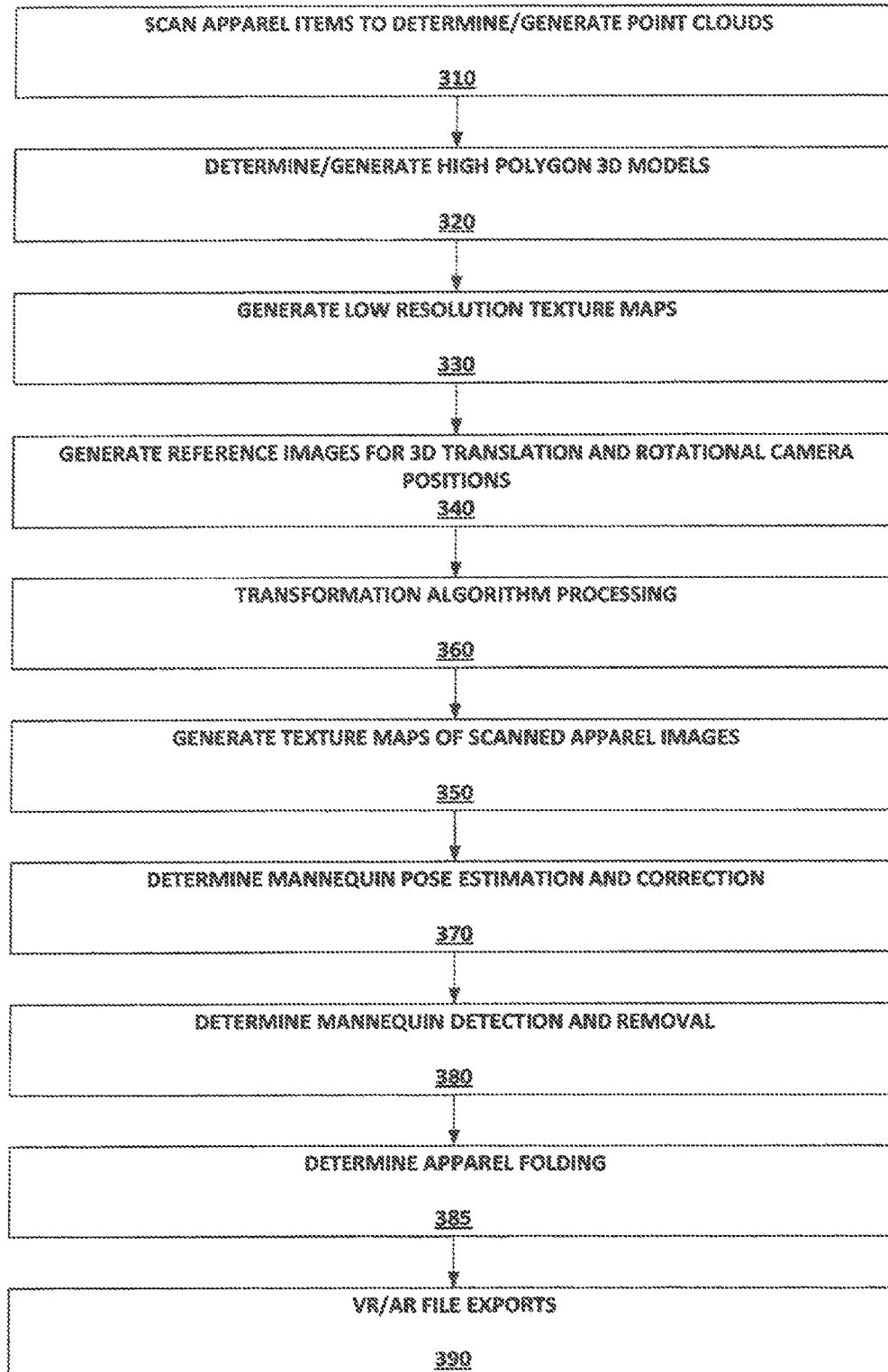
FIG. 2 depicts an illustrative logical flow diagram of use of the system of FIG. 1 to achieve the functionality of the present invention.

With the exemplary computing system environment 100 of FIG. 1 being generally shown and discussed above, and with reference now to FIG. 2, in accordance with an illustrated embodiment, it is to be appreciated and understood the present invention determines and generates "Mixed Reality" ready 3D models. In an illustrative method of use, preferably a scanning application implemented on a computer processing device 100, and preferably utilizing a depth sensor and RGB camera 150, is specifically configured to generate point clouds (step 310) from a scan of an apparel item. Next, this enables the computer processing device 100 to generate one or more high polygon 3D models utilizing the generated point clouds (step 320). Additionally, the computer processing device generates one or more low resolution texture maps (step 330). It is to be appreciated that if any mesh holes exists, in accordance with the illustrated embodiments, the computer processing device 100 preferably fills-in such mesh holes.

Next, while the computer processing device 100 is scanning the apparel item using preferably using the depth sensor and RGB camera 150, the computer processing device 100 generates high resolution reference images pertaining to the generated model associated with respective 3D translation and rotational camera positions (step 340). This enables the computer processing device 100 to determine and generate recreation of high resolution texture maps of the scanned apparel image (step 350). Next, content generated from the from scanner app undergoes, through a series of transformation algorithms, including Noise Removal, Mesh Retopology and Decimation, Normal Maps Generation (step 360). It is to be appreciated high resolution Textures Regeneration preferably utilizing reference images, determines Optimal Registration of segmented texture maps specific to apparel items/garments. Next, the computer processing device 100 preferably determines a Mannequin's Pose estimation and correction (370), Mannequin Detection and Removal (step 380), preferably utilizing machine learning techniques. The computer processing device 100 is further configured to determine Apparel Folding (e.g., determine fold lines/creases) (step 385), which are then preferably exported into VR/AR file formats (step 390).

Thus, in accordance with an illustrated embodiment, an output of the computer processing device preferably consists of a series of 3D models having high resolution texture maps enabled and configured to generate three 3 distinct apparel versions—with Mannequin, Without Mannequin with hanger and Without Mannequin and Folded.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A computer process for scanning apparel items for generation of three dimensional (3D) reproduced representations of scanned apparel items having folding line indications, comprising:

creating an electronic scan of at least one apparel item utilizing a depth sensor and RGB camera mounted on a rotational axis;

generating point clouds from the electronic scan of the at least one apparel item;

generating at least one high polygon 3D model and one or more low resolution texture maps from the generated point clouds;

generating 3D translation and rotational camera reference images pertaining to the at least one high polygon 3D model;

generating high resolution texture maps utilizing the generated 3D translational and rotational camera reference images;
generating normal maps utilizing the generated high resolution texture maps utilizing transformation algorithms;
determining mannequin pose estimation, correction, as well as mannequin detection and removal relative to the at least one scanned apparel item using machine learning techniques; and
determining data for indicating fold lines for folding the at least one scanned apparel item.

2. The computer process for scanning apparel items as recited in claim 1, further including:
determining the presence of one or more mesh holes in the at least one scanned apparel item; and
filling-in the determined one or more mesh holes so as to obviate the presence of the one or more mesh holes in a reproduced 3D representation of the at least one scanned apparel item.

3. The computer process for scanning apparel items as recited in claim 1, further including determining optimal registration of segmented texture maps regarding one or more apparel items utilizing the generated recreated high resolution texture maps of the at least one scanned apparel item.

4. A computer system for scanning apparel items for generation of three dimensional (3D) reproduced representations of scanned apparel items having folding line indications, comprising:
a memory configured to store instructions;
a processor disposed in communication with the memory, wherein said processor upon execution of the instructions is configured to:
create an electronic scan of at least one apparel item utilizing a depth sensor and a RGB camera device mounted on a rotational axis;
generate point clouds from the electronic scan of the at least one apparel item;
generate at least one high polygon 3D model and one or more low resolution texture maps from the generated point clouds;
generate 3D translation and rotational camera reference images pertaining to the at least one high polygon 3D model;
generate high resolution texture maps utilizing the generated 3D translational and rotational camera reference images;
generate normal maps utilizing the generated high resolution texture maps utilizing transformation algorithms;
determine mannequin pose estimation, and correction, as well as mannequin detection and removal relative to the at least one scanned apparel item using machine learning techniques; and
determine data for indicating fold lines for folding the at least one scanned apparel item.

5. The computer system as recited in claim 4, wherein the processor is further configured to:
determine the presence of one or more mesh holes in the at least one scanned apparel item; and
fill-in the determined one or more mesh holes so as to obviate the presence of the one or more mesh holes in a reproduced 3D representation of the at least one scanned apparel item.

6. A non-transitory computer readable storage medium and one or more computer programs embedded therein, the computer programs comprising instructions, which when executed by a computer system, cause the computer system to:
create an electronic scan of at least one apparel item utilizing a depth sensor and a RGB camera device mounted on a rotational axis;
generate point clouds from the electronic scan of the at least one apparel item;
generate at least one high polygon 3D model and one or more low resolution texture maps from the generated point clouds;
generate 3D translation and rotational camera reference images pertaining to the at least one high polygon 3D model;
generate high resolution texture maps utilizing the generated 3D translational and rotational camera reference images;
generate normal maps utilizing the generated high resolution texture maps utilizing transformation algorithms;
determine mannequin pose estimation, correction, as well as mannequin detection and removal relative to the at least one scanned apparel item using machine learning techniques; and
determine data for indicating fold lines for folding the at least one scanned apparel item.

7. The non-transitory computer readable storage medium as recited in claim 6, wherein the one or more computer programs further cause the computer system to:
determine the presence of one or more mesh holes in the at least one scanned apparel item; and
fill-in the determined one or more mesh holes so as to obviate the presence of the one or more mesh holes in a reproduced 3D representation of the at least one scanned apparel item.

* * * * *